(12) United States Patent
Lenz

(10) Patent No.: US 10,853,599 B2
(45) Date of Patent: Dec. 1, 2020

(54) METHOD FOR OBTAINING INFORMATION FROM A CODING BODY, SYSTEM COMPRISING A CODING BODY, COMPUTER PROGRAM PRODUCT AND DATA STORAGE MEANS

(71) Applicant: Prüftechnik Dieter Busch AG, Ismaning (DE)

(72) Inventor: Johann Lenz, Ismaning (DE)

(73) Assignee: PRÜFTECHNIK DIETER BUSCH AG, Ismaning (DE)

( * ) Notice: Subject to any disclaimer, the term of this patent is extended or adjusted under 35 U.S.C. 154(b) by 83 days.

(21) Appl. No.: 15/570,132

(22) PCT Filed: Apr. 19, 2016

(86) PCT No.: PCT/DE2016/100185
§ 371 (c)(1),
(2) Date: Oct. 27, 2017

(87) PCT Pub. No.: WO2016/173582
PCT Pub. Date: Nov. 3, 2016

(65) Prior Publication Data
US 2018/0129843 A1    May 10, 2018

(30) Foreign Application Priority Data
Apr. 30, 2015   (DE) ........................ 10 2015 208 121

(51) Int. Cl.
*G06K 7/10*     (2006.01)
*G06K 7/14*     (2006.01)
(Continued)

(52) U.S. Cl.
CPC ..... *G06K 7/10712* (2013.01); *G06K 7/10891* (2013.01); *G06K 7/1443* (2013.01); *H04N 19/119* (2014.11); *G01D 11/30* (2013.01)

(58) Field of Classification Search
CPC combination set(s) only.
See application file for complete search history.

(56) References Cited

U.S. PATENT DOCUMENTS

3,309,669 A * 3/1967 Lemelson ................ G06K 9/20
382/212
3,755,655 A * 8/1973 Senecal ................ G06K 19/063
235/487

(Continued)

FOREIGN PATENT DOCUMENTS

CN      101319918 A  * 12/2008
DE    102007022355 A1    11/2008

(Continued)

OTHER PUBLICATIONS

SAP : "Wearables at Work: Augmented Reality Solutions for the Enterprise", youtube, Oct. 16, 2014 (Oct. 16, 2014), p. 1 pp., XP054976763, retrieved from the Internet: URL: https://www.youtube.com/watch?v=TxzWJy1IAO0 (retrieved on Sep. 2, 2016).

(Continued)

*Primary Examiner* — Tsung Yin Tsai
(74) *Attorney, Agent, or Firm* — Millman IP Inc.

(57) ABSTRACT

In a method for obtaining information from a coding body (1, 15), information is assigned to a three-dimensional form of at least one portion of the coding body (1, 15), at least one two-dimensional image of at least the portion of the coding body (1, 15) is generated, the form of the portion is identified on the basis of the image and the information that has been assigned to the identified form is accessed. A corresponding system comprises: at least one coding body (1, 15) having at least one portion with a three-dimensional form that has information assigned; at least one image-capture means (8, 19, 24) for generating two-dimensional images; and at least one processor (9, 21, 25) configured to identify the form of the portion on the basis of at least one two-dimensional (Continued)

image of at least the portion of the coding body (1, 15) and to access the information assigned to the identified form.

12 Claims, 2 Drawing Sheets

(51) Int. Cl.
*H04N 19/119* (2014.01)
*G01D 11/30* (2006.01)

(56) References Cited

U.S. PATENT DOCUMENTS

| | | | | |
|---|---|---|---|---|
| 3,974,916 | A * | 8/1976 | Bartolucci | B65D 43/00 |
| | | | | 206/459.1 |
| 5,581,636 | A * | 12/1996 | Skinger | G06K 7/10594 |
| | | | | 382/276 |
| 6,088,482 | A * | 7/2000 | He | G06K 7/14 |
| | | | | 235/494 |
| 6,206,229 | B1 * | 3/2001 | Harjes | A47G 23/16 |
| | | | | 220/669 |
| 6,527,181 | B1 * | 3/2003 | Kleeberg | B65D 51/245 |
| | | | | 235/462.03 |
| 6,950,800 | B1 * | 9/2005 | McIntyre | G06F 21/31 |
| | | | | 705/1.1 |
| 7,222,789 | B2 * | 5/2007 | Longacre, Jr. | G06K 7/10712 |
| | | | | 235/450 |
| 7,708,205 | B2 * | 5/2010 | Kotlarsky | G06K 7/10851 |
| | | | | 235/462.24 |
| 7,992,741 | B2 * | 8/2011 | Hundley | B65D 47/0847 |
| | | | | 220/254.5 |
| 9,805,240 | B1 * | 10/2017 | Zheng | G06K 7/1443 |
| 2002/0106135 | A1 * | 8/2002 | Iwane | G06T 7/74 |
| | | | | 382/305 |
| 2008/0001106 | A1 * | 1/2008 | Igarashi | H02K 29/10 |
| | | | | 250/566 |
| 2008/0117414 | A1 * | 5/2008 | Hollander | G01D 5/26 |
| | | | | 356/139.09 |
| 2009/0267595 | A1 * | 10/2009 | Munekata | G01D 5/145 |
| | | | | 324/207.25 |
| 2010/0276495 | A1 * | 11/2010 | Goldstein | B42D 25/285 |
| | | | | 235/488 |
| 2013/0131504 | A1 | 5/2013 | Daon | |
| 2013/0265502 | A1 * | 10/2013 | Huebner | H04N 9/3173 |
| | | | | 348/789 |
| 2014/0126767 | A1 * | 5/2014 | Daon | A61B 34/20 |
| | | | | 382/103 |
| 2015/0182293 | A1 | 7/2015 | Yang et al. | |
| 2015/0209118 | A1 * | 7/2015 | Kopelman | G06T 7/593 |
| | | | | 433/25 |
| 2015/0227772 | A1 * | 8/2015 | Landgrebe | G06K 7/1443 |
| | | | | 235/462.08 |
| 2016/0163067 | A1 * | 6/2016 | Williams | G06K 9/00201 |
| | | | | 382/154 |
| 2018/0350056 | A1 * | 12/2018 | Cardenas Bernal | G06T 7/001 |

FOREIGN PATENT DOCUMENTS

| | | | |
|---|---|---|---|
| DE | 102012014277 A1 | 2/2013 | |
| DE | 10 2012 012269 B3 | 5/2013 | |
| FR | 2008247 A1 * | 1/1970 | B65G 47/48 |
| FR | 2968797 A1 | 6/2012 | |
| WO | 2008138321 A1 | 11/2008 | |
| WO | 2009027088 A1 | 3/2009 | |

OTHER PUBLICATIONS

Leonid Poliakov et al.: "Ansprechpartner", Jan. 13, 2015 (Jan. 13, 2015), XP055299521, retrieved from the Internet: URL: https://www.ubimax.us/images/News/Press Releases/Ubimax_-_Pressemitteilung_LogiMAT_2015.pdf [retrieved on Sep. 2, 2016].
European Search Report for Application No. 16 742 155.1 dated Jun. 19, 2020.

* cited by examiner

METHOD FOR OBTAINING INFORMATION FROM A CODING BODY, SYSTEM COMPRISING A CODING BODY, COMPUTER PROGRAM PRODUCT AND DATA STORAGE MEANS

The present invention relates to a method for obtaining information from a coding body, in which an item of information is assigned to a three-dimensional shape of at least one section of the coding body, to a system having such a coding body, to a computer program product having program instructions which, when executed by a processor of such a system, cause such a method to be carried out, and to a data storage means on which such a computer program product is stored.

In practice, it is necessary, in particular in the case of machines having moving parts, to regularly examine their operating state. For this purpose, different variables, for example oscillations or vibrations or the temperature at particular points of the machines, are measured using suitable sensors. DE 10 2012 014 277 A1 discloses, for example, setting up distributed measuring points on the machines for this purpose, which measuring points can be connected to a data collector, suitable sensors either being able to be arranged at the measuring point or being able to be provided in the data collector. In order to be able to distinguish these measuring points from one another or to uniquely identify them, the measuring points are provided with an identification. However, machines as such may also be provided with a corresponding identification in order to uniquely identify them.

In order to identify machines and machine parts such as measuring points, it is known practice to fasten signs or stickers containing barcodes, for example, directly to the machine. RFID (Radio Frequency Identification) transponders are often also used for identification, as described in DE 10 2007 022 355 A1, for example. In the case of these RFID transponders, wireless data interchange takes place between the RFID transponder and a remote reading unit. The document mentioned last also describes the practice of providing measuring points with identity data which can be automatically read by a separate reading device. For this purpose, the measuring point is provided with a coded plastic ring in a transducer system. The transducer system is firmly locked at the measuring point via a bayonet closure. A coding ring sensor initially scans a ring pattern in the plastic ring and detects therefrom what measuring point is involved. The measurements previously programmed for this measuring point are then carried out.

Although the transducer system described is used to achieve automatic measuring point detection, the mechanical decoding of the measuring point used in this system is naturally relatively susceptible to wear and is therefore also subject to an increased amount of maintenance. In addition, the coded plastic ring can be read only by a special handheld probe having the coding ring sensor. However, barcode systems and identifications using RFID transponders also have disadvantages. Barcode systems require an optical reading unit, but detection is not possible if the barcode stickers are soiled or damaged, whereas communication problems often arise with RFID transponders in an electromagnetically loaded environment.

Therefore, the object of the present invention is to obtain coded information in a reliable and simple manner.

This object is achieved by means of the method having the features of claim 1, by means of the system having the features of claim 4, by means of the computer program product having the features of claim 7 and by means of the data storage means having the features of claim 8. The dependent claims relate to preferred embodiments.

The present invention provides a coding body which has at least one section having a three-dimensional shape which is assigned an item of information. The coding body may be, in particular, a known coded plastic ring. Instead of scanning the coding body using a sensor in a known manner and deriving coded information from the scanning, a two-dimensional image of at least the section of the coding body or of the entire coding body is generated according to the invention. The shape of the section is then detected on the basis of this image and the information assigned to the detected shape is accessed or the information represented by the shape is derived from said shape. When coding information and recovering it, the invention therefore makes it possible to dispense with error-prone barcode systems and RFID transponders and to switch to coding bodies which are substantially more robust in practical use such as coded plastic rings, without having to accept their disadvantages such as the susceptibility to wear and the increased amount of maintenance, since the coding bodies are not mechanically scanned. Therefore, coded information can be obtained in a reliable and simple manner. It is also possible to dispense with a special handheld probe having a coding sensor and therefore to save costs. Instead of providing a separate device, such as a handheld probe, for the purpose of obtaining the information, the image capture means for generating two-dimensional images and the processor for detecting shapes in the generated images and for deriving information therefrom can be implemented in any desired apparatuses which already exist. Here, in the simplest case, the image capture means may be a still or film camera and, in particular, a digital camera, whereas the processor may be a miniature computer or minicomputer.

The coding body is preferably arranged on an apparatus and at least one part of the apparatus is identified on the basis of the obtained information. For example, for the purpose of identifying a specific measuring point which is provided for the purpose of reading data from a sensor or for attaching a sensor for carrying out a measurement, the coding body may be provided as part of an apparatus, for example a machine or wind power plant. On the other hand, it is also possible to also identify the entire apparatus as such on the basis of the obtained information.

Furthermore, the coding body is preferably substantially annular or in the form of a ring section. The present invention therefore practically allows recourse to be had to coding bodies which are already available, for example known coded plastic rings, which are usually read by a special handheld probe having a coding ring sensor. Therefore, for the present invention, it is not necessary to design and manufacture entirely new coding bodies and arrange them on the apparatus.

The two-dimensional image is particularly preferably generated by an integrated image capture means of a data collector or of an aligning device or of a measuring device or of data glasses. Accordingly, the image capture means and/or the processor is/are particularly preferably integrated in a data collector or an aligning device or a measuring device or data glasses. Aligning devices are used to align axes of rotation of rotatably mounted machine parts of two machines in a flush manner. They generally comprise a light emission apparatus for emitting a light beam and at least one light capture apparatus which has a light-sensitive surface, in which case a position at which a light beam emitted by the light emission apparatus impinges on the light-sensitive surface can be recorded. These are usually laser-optical aligning devices having a laser emission apparatus which emits a laser beam. In this case, the image capture means may be arranged either on the light emission apparatus or on the light capture apparatus. However, both the light emission apparatus and the light capture apparatus may also be provided with at least one image capture means. The data collector may be a conventional data collector which is provided for connection to a measuring point in order to either receive data from the measuring point or to carry out measurements by means of a sensor integrated in the data collector. Quite generally, the image capture means may be arranged in an arbitrary measuring device which does not necessarily have to be connected to a measuring point.

Data glasses usually have not only an image capture means and a processor but additionally also a display means in the form of a so-called head-up display (HUD), in the case of which a wearer of the data glasses can maintain the position of his head or his viewing direction because information is projected into his field of vision. This information can be combined with images captured by the image capture means. The display means usually has an internal projector and a prism. An angle between the image capture means and a frame of the data glasses can be advantageously adjusted in order to increase the recording area of the image capture means. Apart from data and information such as numerical values, drawings, plans, graphs, diagrams, films, images or text, other information relevant to the operation of an apparatus can also be displayed in the display means in the form of augmented reality (AR) in the display means. The data glasses advantageously access stored data on the basis of the obtained information. These data may be stored in a data memory of the data glasses or in an external memory. In the latter case, the data glasses may be advantageously set up for a wired or wireless data transmission or communication connection to at least one external device. The stored data may be, for example, technical data or specifications of an apparatus or dimensions of the apparatus or parts of the apparatus, for example measuring points. After the apparatus or measuring point has been identified, precisely that information which is needed by an operator for his work can be displayed to an operator in the display means of the data glasses. In addition, an order to maintain the apparatus which is stored in an external maintenance database may be accessed via an interface.

The computer program product may be software programmed in any desired manner. This software may be stored on any desired data storage means or storage medium for storing data, for example a magnetic or optical or volatile or non-volatile data storage medium, for example a CD (Compact Disc), a DVD (Digital Versatile Disc), a hard disk, a RAM (Random Access Memory), a ROM (Read Only Memory), a PROM (Programmable Read Only Memory) or an EPROM (Erasable Programmable Read Only Memory).

The invention is described in more detail below on the basis of preferred exemplary embodiments with the aid of drawings, in which.

Figure 1:
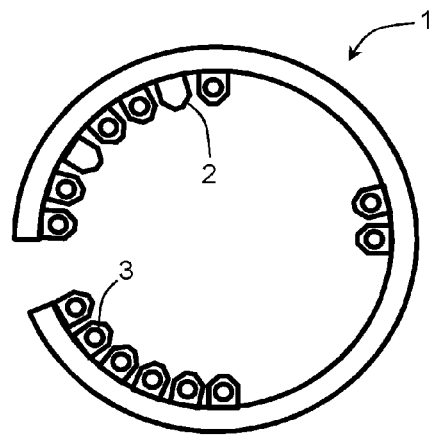
FIG. 1 shows a coding body.

FIG. 1 illustrates a coding body 1 in the form of a coded plastic ring section. The plastic ring has a plurality of trapezoidal projections 2 on an inner surface. Some of these projections 2 are provided with a through-hole 3 and others in turn do not have a through-hole 3. Projections 2 without a through-hole 3 are used to determine the position of the coding body 1. A suitable tool may be attached to the through-holes 3 in order to break off selected projections 2 from the coding body 1. Breaking-off or removing particular projections 2, while other projections 2 are retained, makes it possible to produce a specific arrangement of projections 2 with specific spaces between the projections 2. This specific arrangement or this pattern of projections 2 and spaces codes an item of information in a similar manner to a punched card. In other words, the sequence of projections 2 of the coding body 1 and spaces represents the information or the information is assigned to the three-dimensional shape of the coding body 1. The information assigned to this shape or represented by the shape is available for retrieval in a suitable storage means.

Figure 2:
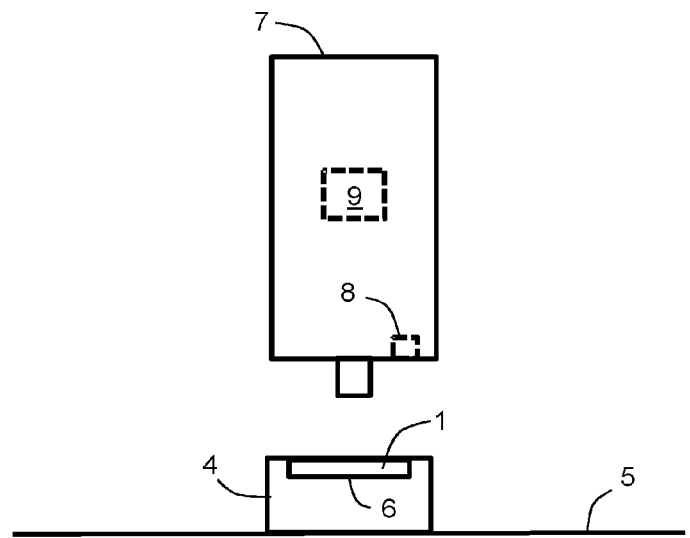
FIG. 2 shows a measuring point having a coding body and a data collector.

As shown in FIG. 2, a measuring point 4 of a machine 5 is identified in a known manner by means of the coding body 1, the coding body 1 being accommodated in a receptacle 6 of the measuring point 4 in such a manner that the sequence of projections 2 and spaces remains visible.

In order to read data from a data memory not shown in FIG. 2 or to carry out measurements, the measuring point 4 can be connected to a data collector 7. The data collector 7 has, inter alia, a camera 8 as image recording means and a processor 9.

In order to identify the measuring point 4, the camera 8 of the data collector 7 generates a two-dimensional image of the three-dimensional coding body 1 which is accommodated in the receptacle 6 of the measuring point 4 and on which, in particular, the sequence of projections 2 and spaces on the inner side of the coding body 1 is captured. Software which runs on the processor 9 processes this image. The software is capable of pattern recognition, in particular. The software is used to recognize a pattern of the sequence of projections 2 and spaces and to detect its shape therefrom. On the basis of the detected shape or the recognized pattern, it is then possible for the processor 9 to access the information assigned to the sequence of projections 2 and spaces and to identify the measuring point 4 thanks to said information.

Figure 3:
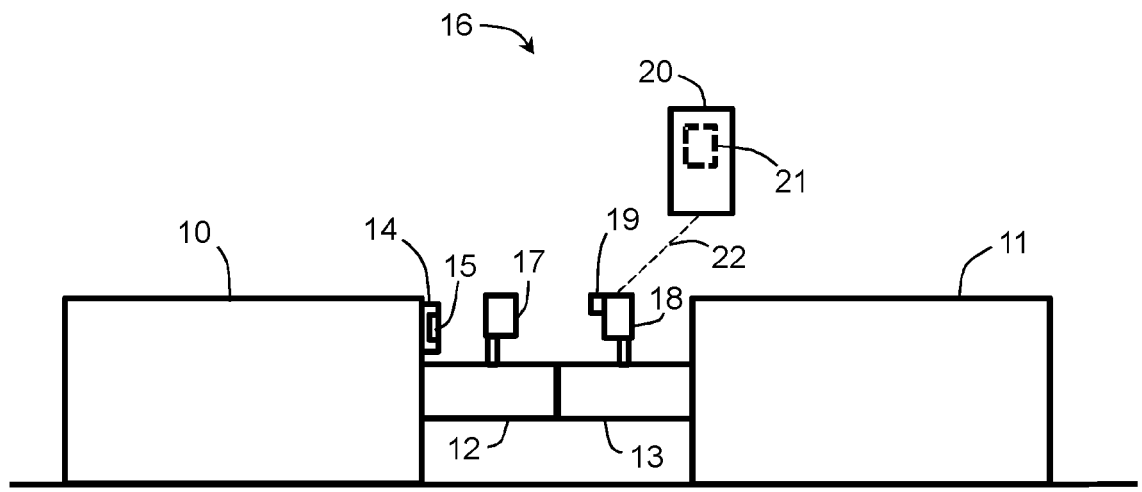
FIG. 3 shows apparatuses having a coding body and a laser-optical aligning system.
Figure 4:
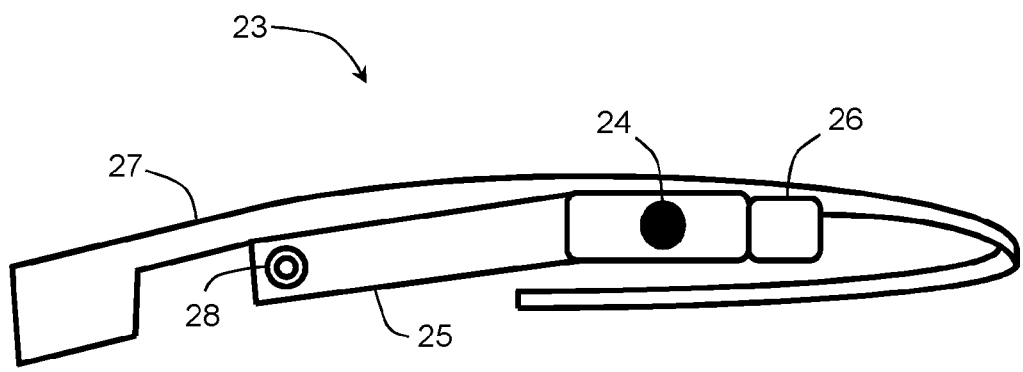
FIG. 4 shows data glasses.

Another exemplary embodiment of the present invention is shown in FIG. 3 in which two machines 10 and 11 with respective rotatably mounted machine parts 12 and 13 can be seen. In the present case, the machine 10 has a measuring point 14 for docking a data collector (not shown), at which a coding body 15 is provided, as described above.

A laser-optical aligning system 16 is provided for the purpose of aligning the machines 10 and 11 or the machine parts 12 and 13, the machine parts 12 and 13 needing to be brought in a known manner into an arrangement in which their axes of rotation are aligned with one another. The aligning system 16 has a laser emission apparatus 17, a laser capture apparatus 18 with a camera 19 and a handheld device 20 with a processor 21. A wireless communication connection 22 can be established between the laser capture apparatus 18 and the handheld device 20.

Like in the previous example in FIG. 2, a two-dimensional image of the coding body 15 is also generated by the camera 19 in the example in FIG. 3 in order to identify the machine 10. For this purpose, the camera 19 can be controlled by the processor 21 of the handheld device 20 via the communication connection 22. The generated image is transmitted, via the communication connection 22, from the camera 19 to the processor 21 of the handheld device 20 on which software for detecting a shape of the coding body 15 runs, as described above, which software detects the machine 10 in the described manner on the basis of the image generated by the camera 19.

It goes without saying that a camera could also be alternatively or additionally provided on the laser capture apparatus 18 in order to identify the machine 11 in the same manner on the basis of a coding body (not shown in FIG. 3) arranged on the machine 11.

It is particularly simple to identify machines on the basis of a two-dimensional image of a coding body generated using data glasses. For this purpose, the figure shows data glasses 23 in an enlarged view. Like known data glasses, the data glasses 23 also have a camera 24 as image capture means, a processor 25 as data processing means and a head-up display or HUD 26 as display means. In this case, the HUD 26 is arranged in such a manner that it is positioned in front of an eye of a wearer of the data glasses 23. The camera 24 is arranged beside the HUD 26 toward the ear of the wearer of the data glasses 23, whereas the processor 25 is on an adjoining side piece 27. Like in the examples described above, the processor 25 is set up to execute suitable software for detecting shapes of three-dimensional bodies on the basis of two-dimensional images of the bodies. Furthermore, an interface 28 is provided in the present case and can be used to establish a wireless data transmission connection to the data glasses 23.

The data glasses 23 have the advantage that a wearer of the data glasses 23 can conveniently generate a two-dimensional image of a coding body, for example of the coding body 1 at the measuring point 4 of the machine 5 or of the coding body 15 on the machine 10, and can immediately process the image by the processor 25 for the purpose of identifying the relevant machine. The result of this processing can then be displayed in the HUD 26 in a manner visible to the wearer of the data glasses 23.

In a corresponding manner, two-dimensional images of three-dimensional coding bodies can be generated using image recording means or cameras of any desired devices, for example measuring devices, and machines or installations provided with these coding bodies can be identified on the basis of the generated images. Although the present exemplary embodiments relate to the specific case of identifying machines or installations, the subject matter of the present invention can nevertheless be quite generally used to obtain information from a coding body for any desired purpose.

LIST OF REFERENCE SYMBOLS

1. Coding body
2. Projection
3. Through-hole
4. Measuring point
5. Machine
6. Receptacle
7. Data collector
8. Camera
9. Processor
10. Machine
11. Machine
12. Machine part
13. Machine part
14. Measuring point
15. Coding body
16. Aligning system
17. Laser emission apparatus
18. Laser capture apparatus
19. Camera
20. Handheld device
21. Processor
22. Communication connection
23. Data glasses
24. Camera
25. Processor
26. HUD
27. Side piece
28. Interface

What is claimed is:

1. A method for obtaining information from a coding body, in which
    representing an item of information via a three-dimensional shape of at least one section of the coding body having a plurality of discrete elements that can be removed to represent the item of information,
    at least one two-dimensional image of at least the at least one section of the coding body is generated,
    the shape of the at least one section is detected on the basis of the image, and
    the information assigned to the detected shape is accessed.

2. The method as claimed in claim 1, the coding body being arranged on an apparatus and at least one part of the apparatus being identified on the basis of the obtained information.

3. The method as claimed in claim 1, in which the two-dimensional image is generated by an integrated image capture means of a data collector or of an aligning device or of a measuring device or of data glasses.

4. A system having at least one coding body which has at least one section having a plurality of discrete elements that can be removed displaced to provide a three-dimensional shape representing an item of information, at least one image capture means for generating two-dimensional images and at least one processor which is set up to detect the shape of the at least one section on the basis of at least one two-dimensional image of at least the section of the coding body and to access the information assigned to the detected shape.

5. The system as claimed in claim 4, in which the coding body is substantially annular or in the form of a ring section.

6. The system as claimed in claim 4, in which the image capture means and/or the processor is/are integrated in a data collector or an aligning device or a measuring device or data glasses.

7. A computer program product having program instructions which, when executed by a processor of a system as claimed in claim 4, cause a method as claimed in claim 1 to be carried out.

8. A data storage means on which a computer program product as claimed in claim 7 is stored.

9. The method according to claim 1, wherein the discrete elements are projections.

10. The method according to claim 9, wherein at least a subset of the projections have a through-hole to facilitate removal thereof.

11. The system according to claim 4, wherein the discrete elements are projections.

12. The system according to claim 11, wherein at least a subset of the projections have a through-hole to facilitate removal thereof.

* * * * *